Dec. 1, 1936.          T. H. JACOB          2,062,788
TRAILER HITCH
Filed Feb. 20, 1935          2 Sheets-Sheet 1

Inventor
T. H. Jacob
By
Attorneys

Dec. 1, 1936.　　　T. H. JACOB　　　2,062,788
TRAILER HITCH
Filed Feb. 20, 1935　　　2 Sheets-Sheet 2
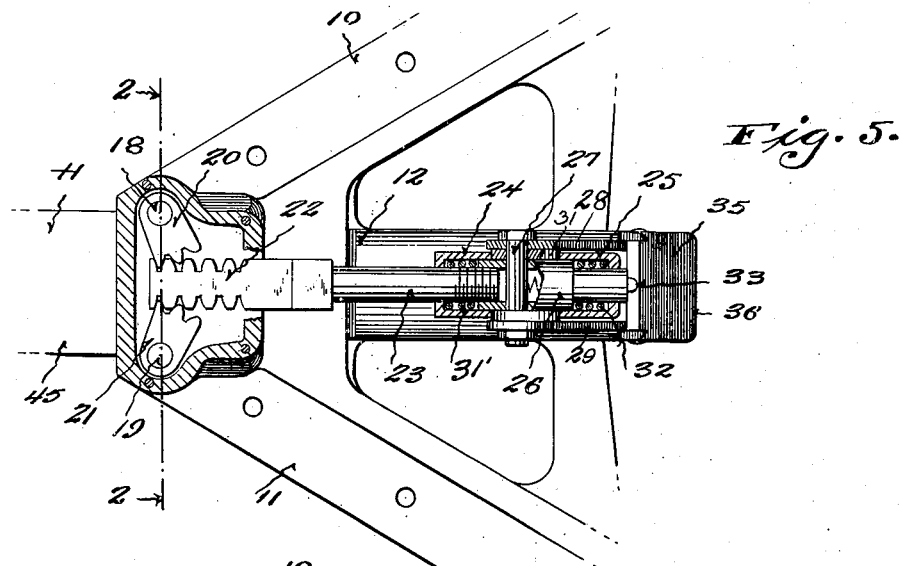
Fig. 5.
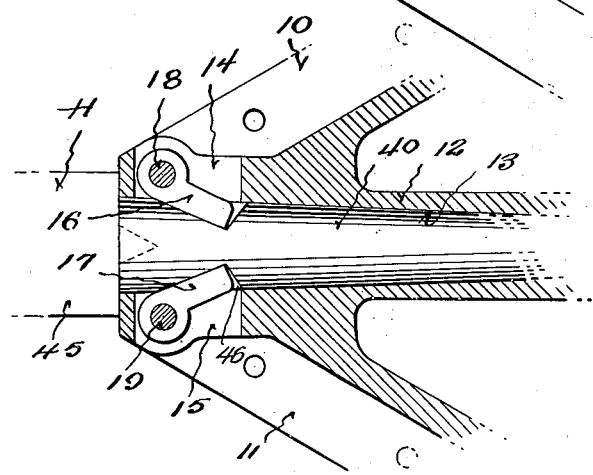
Fig. 6.
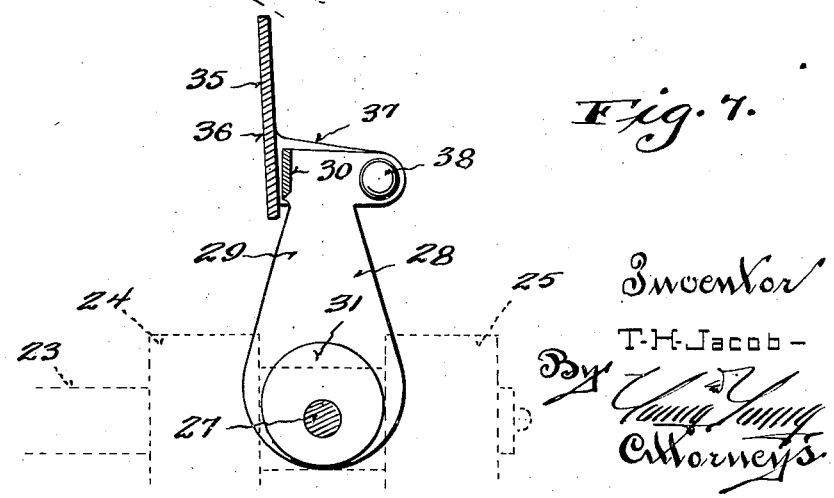
Fig. 7.
Inventor
T. H. Jacob
By
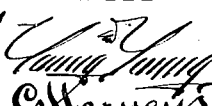
Attorneys Patented Dec. 1, 1936

2,062,788

UNITED STATES PATENT OFFICE 2,062,788

TRAILER HITCH

Thomas H. Jacob, Wausau, Wis.

Application February 20, 1935, Serial No. 7,396

10 Claims. (Cl. 280—33.15)

This invention appertains to hitches of the character particularly adapted for detachably connecting trailers of various types to a drawing vehicle, such as an automobile.

It is one of the primary objects of my present invention to provide means for facilitating the coupling of the component parts of the hitch carried respectively by the trailer and the drawing vehicle together, so that such coupling can be easily and quickly accomplished by a single operator without undue effort on his part.

Another salient object of my invention is to provide a trailer hitch in which the coupling can be automatically accomplished by the backing of the drawing vehicle.

A further object of my invention is to provide novel means for guiding the trailer-carried hitch shank into the drawing vehicle coupling part, whereby the said parts can be conveniently and automatically connected upon the backing of the vehicle.

A further important object of my invention is to provide novel means for positively locking the hitch parts together after the automatic coupling thereof, whereby accidental separation thereof incident to travel over a rough roadway is precluded.

A further object of my invention is to provide an automatic trailer hitch having a pair of swinging latch and lock dogs carried by the drawing vehicle for engagement with a coupling shank, manual means being provided for moving the dogs to a released position, to an automatic latching position, and to a positive locking position.

A further object of my invention is the provision of novel means for releasably holding the operating lever for the dogs in its positive locking position, so that accidental movement of said lever will be prevented.

A still further object of my invention is to provide an automatic coupling device for trailer hitches of the above character, which will be durable and efficient in use, one that will be simple and easy to manufacture, and one which can be placed upon the market and associated with a trailer and an automobile at a low cost.

With these and other objects in view, the invention consists in the novel construction, arrangement, and formation of parts, as will be hereinafter more specifically described, claimed, and illustrated in the accompanying drawings, in which:—

Figure 5 is a fragmentary top plan view of the improved hitch, with parts thereof broken away and in section showing the hitch in its positive locked position.

Figure 6 is a horizontal section through the hitch taken in a plane below Figure 5, illustrating the engagement of the latching dogs with the hitch shank.

Figure 7 is an enlarged, detail, vertical sectional view illustrating the operating lever and its latch, the lever being shown in its automatic latching position.

Figure 1:
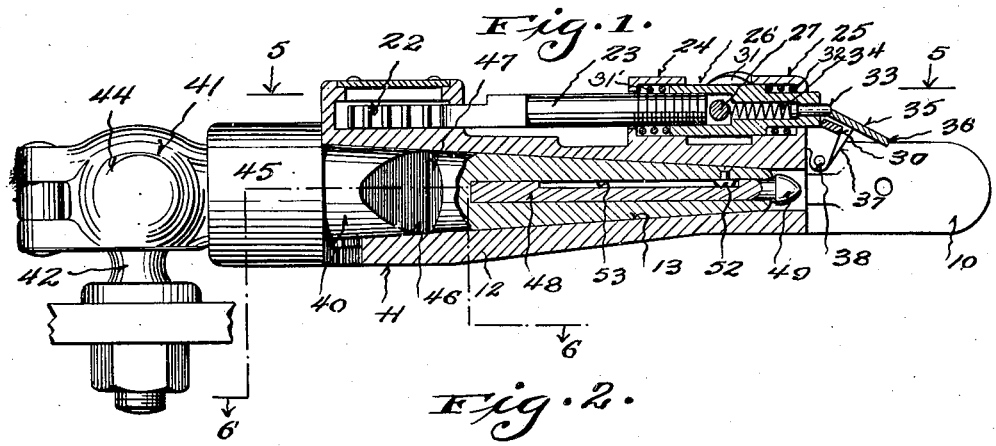
Figure 1 is a side elevation of my improved trailer hitch, with the parts in their coupled position and positively locked against accidental movement, parts of the view being shown broken away and in longitudinal section.
Figure 2:
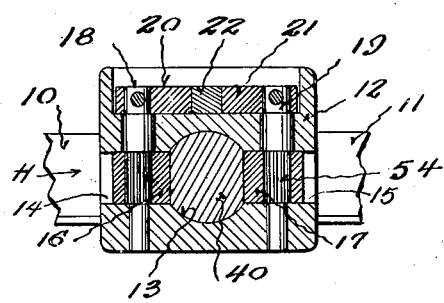
Figure 2 is a transverse section through the improved hitch taken substantially on the line 2—2 of Figure 5.
Figure 3:
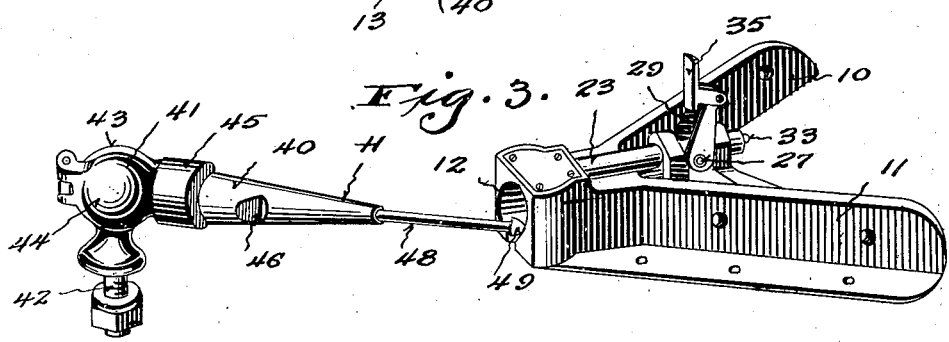
Figure 3 is a perspective view of the improved hitch, showing the parts in their uncoupled position and illustrating the means for guiding the hitch shank into its coupling socket.
Figure 4:
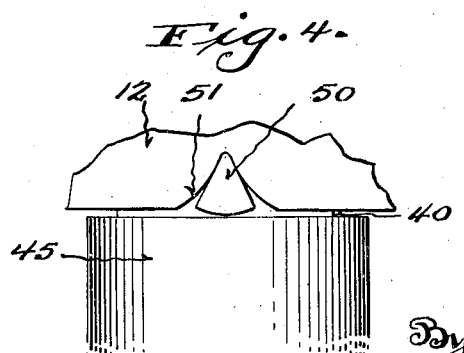
Figure 4 is an enlarged, fragmentary, detail bottom plan view, illustrating the means for rotating the coupling shank during its movement into its socket for insuring the proper position of the keeper notches relative to the latch dogs.

Referring to the drawings in detail, wherein similar reference characters designate corresponding parts throughout the several views, the letter H generally indicates my improved trailer hitch, and the same embodies a drawbar, or tongue, 10 carried by the trailer. The trailer has not been illustrated in the drawings, and it is to be understood that trailers of various types and characters can be coupled to the drawing vehicle by the use of my improved hitch.

The drawbar 10 will naturally vary in construction with different types of trailers, and in the present instance, I have illustrated a drawbar iron including diverging angle bars 11, which are adapted to be bolted or riveted to the desired part of the trailer.

Disposed between the angle bars 11 is my novel coupling socket 12, and this socket is connected to the bars 11 at the point where said bars converge. The socket 12 is provided with an elongated longitudinally extending bore 13, which tapers from its outer end to its inner end, for a purpose which will be later set forth.

Communicating with the opposite sides of the bore 13, adjacent to the outer end thereof, is a pair of pockets, or openings, 14 and 15, in which are rockably mounted the latch and lock dogs 16 and 17. These dogs are movable into and out of the tapered bore and are rigidly connected with vertically disposed rock shafts 18 and 19 carried by the socket on opposite sides of the bore. These shafts 18 and 19 extend above the pockets 14 and 15 and have also keyed or otherwise secured thereto sector gears 20 and 21, which engage with the opposite sides of a double-faced rack bar 22.

Connected with or formed on the rack bar 22 is an inwardly extending slide rod 23. Formed on the socket 12, inwardly of the dogs 16 and 17 and the sector gears 20 and 21, is a pair of spaced bearings 24 and 25 arranged in longitudinal alinement. These bearings 24 and 25 slidably receive a reciprocating sleeve 26, which is connected by means of threads or the like to the slide rod 23.

Extending transversely through the sleeve 26, between the bearings 24 and 25, is a supporting pin, or shaft, 27 on which is rockably mounted the arms 28 of the operating lever 29. The outer ends of the arms 28 of the operating lever are connected together by a cross bar, or bridge piece, 30, the purpose of which will be later set forth.

Rigidly connected with the arms 28 of the lever 29 are eccentrics, or cams, 31, the high points of which are adapted to lie between the bearings 24 and 25 in one position of the lever, against the bearing 24 in another position of the lever, and against the bearing 25 in still another position of the lever.

Obviously, when the high points of the cams 31 bear against the bearing 25, the sleeve 27 and the slide rod 23 with its rack bar 22 will be pushed toward the left (referring to Figures 1 and 5), which will rock the sector gears 20 and 21 outwardly and move the dogs 16 and 17 into the bore 13 of the socket 12.

When the high points of the cams 31 bear against the bearing 24, the sleeve 26, the slide rod 23, and the rack bar 22 will be moved inwardly or to the right and thus swing the sector gears 20 and 21 inwardly, and the dogs 16 and 17 out of the bore 13.

It is advisable to note that when the lever 29 is in its raised vertical position, with the high points of the cams 31 between the bearings 24 and 25, the dogs 16 and 17 are partially disposed within the bore, and this position is referred to as the automatic latching position of the dogs. When the lever is swung all the way to the left, the dogs are moved out of the bore, and this is referred to as the released position. When the lever is swung all the way down to the right, the dogs are moved further into the bore and held in such position, and this is known as the positive locking position of the dogs.

Disposed within the bearing 24 is a spring 31', which is coiled about the slide rod 23, and this spring is confined between one end wall of the bearing 24 and one end of the slide sleeve 26. A similar spring 32 is disposed within the bearing 25 and is coiled about a reduced portion of the sleeve 26, and is confined between one end wall of the bearing 25 and the shoulder formed by the reduced portion of the sleeve.

These springs act as means for centering the cams, or eccentrics, 31, and also function to hold the dogs 16 and 17 in their latching position when the lever 29 is in its raised position.

Novel means is provided for latching the lever 29 in its positive locked position, so that all danger of accidental movement of this lever will be prevented. This is accomplished by the use of a spring-pressed latch pin, or detent, 33.

The latch pin 33 is slidably carried by the reduced end of the sleeve 26, and the pin is normally urged outside of the sleeve by the use of a light expansion coil spring 34. This spring 34 is housed within the sleeve 26 and is confined between the cross pin, or shaft, 27 and the latch pin, or detent, 33.

When the lever is swung to its positive locked position, the bridge piece 30 of the operating lever will snap by the spring-pressed latch pin, or detent, 33, and the pin will then function to prevent upward swinging movement of the lever.

To facilitate the releasing of the lever 29 from engagement with the latch pin 33 when it is desired to raise the lever, a manipulating handle 35 is provided. This handle 35 includes a manipulating fingerpiece 36 and ears 37, which are pivotally connected by the use of pins 38 with the arms 28 of the lever.

The central portion of the fingerpiece 36 of the handle normally lies directly in rear of the latch pin 33, and consequently when the fingerpiece is grasped to raise the operating lever 29, the handle will be rocked on its pivot pins, and the inner edge thereof will engage the latch pin 33 and move the same inwardly of the lever, so that upon continued movement of the handle the lever will be raised.

The socket 12 is adapted to receive the elongated tapered shank 40 carried by the hitch proper 41. The hitch proper 41 may be of the same type and character as shown in my prior Patents Nos. 1,927,591 and 1,977,065, issued to me September 19, 1933, and October 16, 1934, respectively.

Hence, the hitch proper 41 includes a stem 42 which is rigidly connected to the preferred part of the drawing vehicle, and this stem carries a ball head received between the hinged parts 43 and 44 of the hitch socket. These parts are normally held in a closed position around the ball by means of sliding spring-pressed sleeve 45, which is mounted on the shank 40. Thus, the shank 40 is free to rock on the stem 42, and as stated, this shank is gradually tapered toward its outer end, and the opposite sides thereof are provided with keeper recesses, or notches, 46.

These notches 46 are provided with abrupt inner walls 47, which are adapted to be engaged by the outer ends of the latch and lock dogs 16 and 17 when the shank is moved into the bore of the socket.

As stated in the objects, it is one of the primary features of the invention to provide means for automatically coupling the trailer to the automobile, and the tapered shank 40 of the hitch is connected with the automobile when the trailer is to be coupled therewith.

Initially, the vehicle is backed until the outer end of the shank is in close proximity to the bore 13 of the socket 12, and the shank is then turned on its ball until the same reaches a position where it can conveniently ride into the socket.

To expedite this initial engagement of the shank with its socket and to facilitate the riding of the shank into the socket, the shank can be provided with a telescoping pilot rod 48. The outer end of the pilot rod 48 has formed thereon a tapered head 49, and normally the pilot rod is positioned within the shank with the head 49 in engagement with the outer end of the shank.

When the automobile has been backed into approximate position, the pilot rod 48 can be slid out of the shank and the head 49 partially inserted into the bore 13. The operator of the vehicle can now continue to back the vehicle, so that the shank 40 will ride completely into the socket.

The sliding movement of the pilot rod 48 is limited by a stop lug 52 received within a longitudinal guide slot 53 formed in said pilot rod.

Prior to the backing of the vehicle, the operating lever 29 is moved to its raised latching position, and hence the dogs 16 and 17 are disposed partially within the bore 13. As the shank 40 rides into the socket, the dogs 16 and 17 will engage the shank and will snap into the keeper recesses, or notches, 46.

The parts are now coupled together, and the operator can swing the lever 29 to its completely lowered position to the right, which will positively prevent further movement of the slide rod 23 and the rack bar 22. Movement of the slide rod will force the dogs into tighter engagement with the walls of the keeper recesses or the notches 46, and the dogs will be held in such position.

When it is desired to uncouple the parts, the lever is swung to the left to its extreme lower position, and upon forward movement of the automobile the shank 40 will be drawn out of the socket.

It is to be understood that the forward end of the trailer with its socket can be held in the desired horizontal position by the use of supporting legs or the like.

Due to the fact that the shank 40 is freely movable on the stem 42, it is necessary and desirable to provide means for insuring the proper positioning of the keeper notches 46 relative to the dogs 16 and 17.

Consequently, a wedge-shaped centering lug 50 is formed on the shank 40 adjacent to its inner end, and the lower wall of the socket 12 has formed therein a flared, wedge-shaped centering notch 51.

When the shank 40 is being inserted in the socket, the centering lug 50 will engage the flared side walls of the notch 51, and thus turn the shank and guide the same into the socket, with the notches 46 in correct position for engagement by the dogs.

The holding sleeve 45 for the parts of the hitch socket 41 is of such a size as to slide over the centering lug 50, and consequently the centering lug does not hinder the operation of the locking sleeve 45 at all.

It is also to be noted that when the shank 40 is in its extreme inserted position within the socket, the sleeve 45 butts up against the socket 12, and hence accidental movement of the sleeve is precluded.

From the foregoing description, it can be seen that I have provided a novel and efficient means for expediting the coupling of automobiles and trailers together.

Changes in details may be made without departing from the spirit or the scope of this invention, but what I claim as new is:—

1. A trailer hitch comprising an elongated tapered shank, a socket member having a tapered bore for receiving the shank, cooperative means on the shank and socket for detachable latching engagement when the shank is inserted in the socket, and a pilot rod slidably carried by the shank for initial insertion in the bore.

2. A trailer hitch comprising an elongated tapered shank, a socket member having a tapered bore for receiving the shank, latching means carried by the socket member for engagement with the shank upon the insertion of the shank in the bore, and a telescoping rod carried by the shank for facilitating the guiding of the shank into the bore upon movement of the shank and socket member toward one another.

3. A trailer hitch comprising an elongated tapered shank, a socket member having a tapered bore for receiving the shank, latching means carried by the socket member for engagement with the shank upon the insertion of the shank in the bore, and means for facilitating the guiding of the shank into the bore upon movement of the shank and socket member toward one another, said means including a guide rod slidably carried by the shank.

4. A trailer hitch comprising an elongated shank having keeper notches in its opposite sides, a socket member having a bore for receiving the shank, pivoted latch dogs carried by the socket member for engagement with the walls of the recesses, means rockably supporting the shank, and interengaging mating members carried by the socket and shank for centering the shank in the socket during the insertion of the shank therein to aline the keeper notches with the dogs.

5. A trailer hitch comprising an elongated shank having keeper notches in its opposite sides, a socket member having a bore for receiving the shank, pivoted latch dogs carried by the socket member for engagement with the walls of the recesses, means rockably supporting the shank, and means for centering the shank in the socket during the insertion of the shank therein to aline the keeper notches with the dogs, said means including a tapered lug carried by the shank, and a centering notch having flaring walls for receiving the wedge.

6. A trailer hitch comprising an elongated shank having a keeper notch, a socket member having a bore for removably receiving the shank, a rock shaft carried by the socket member, a dog secured to the rock shaft movable into and out of the bore for latching engagement with the walls of the keeper notch, means for operating the shaft including a rack bar, a sector gear keyed to the shaft meshing with the teeth of the rack bar, and an operating lever for said rack bar movable to a release position with the dogs out of the bore, to an intermediate position with the dogs partially in said bore, and to a locked position with the dogs in said bore.

7. A trailer hitch comprising an elongated shank having a keeper notch, a socket member having a bore for removably receiving the shank, a rock shaft carried by the socket member, a dog secured to the rock shaft movable into and out of the bore for latching engagement with the walls of the keeper notch, means for operating the shaft including a rack bar, a sector gear keyed to the shaft meshing with the teeth of the rack bar, an operating lever for said rack bar movable to a release position with the dogs out of the bore, to an intermediate position with the dogs partially in said bore, and to a locked position with the dogs in said bore, and means for holding the lever against accidental movement when the same is in its locked position.

8. A trailer hitch comprising an elongated shank having a keeper notch therein, a socket member for receiving the shank, a swinging dog movable into and out of the bore of the socket member, means for manually operating said dog including a sector gear movable with the dog, a sliding rack bar engaging the sector gear, a pair of spaced bearings on the socket member slidably receiving the bar, a sleeve connected with said bar and movable in said bearings, a cross pin connected with the sleeve, a lever having a cam rockable on said cross pin, with the cam disposed between the bearings, and spring means resisting the movement of the rack bar in either direction.

9. A trailer hitch comprising an elongated shank having a keeper notch therein, a socket member for receiving the shank, a swinging dog movable into and out of the bore of the socket member, means for manually operating said dog including a sector gear movable with the dog, a sliding rack bar engaging the sector gear, a pair of spaced bearings on the socket member slidably receiving the bar, a sleeve connected with said bar and movable in said bearings, a cross pin connected with the sleeve, a lever having a cam rockable on said cross pin, with the cam disposed between the bearings, spring means resisting the movement of the rack bar in either direction, and means for locking the lever against movement when the same is in one of its positions.

10. In a latching device, a support, a pivoted operating lever carried by the support and movable thereover, a spring-pressed latch pin carried by the support and disposed in the path of the lever for holding the lever against accidental movement in one of its positions, and a manipulating fingerpiece rockably carried by the lever for engagement with the pin when the fingerpiece is manipulated to actuate said lever.

THOMAS H. JACOB.